United States Patent [19]
Hecht

[11] 3,976,810
[45] Aug. 24, 1976

[54] PROCESS FOR ANION REMOVAL FROM ORTHOPHOSPHATE COATINGS
[75] Inventor: James Lee Hecht, Richmond, Va.
[73] Assignee: E. I. Du Pont de Nemours and Company, Wilmington, Del.
[22] Filed: Feb. 26, 1975
[21] Appl. No.: 553,426

[52] U.S. Cl.................................. 427/40; 427/371; 427/380; 427/385; 427/407; 427/419; 428/480; 428/522; 428/539
[51] Int. Cl.² ................... C01B 25/36; B32B 27/06; B05D 3/00
[58] Field of Search ........... 427/371, 407, 419, 380, 427/353, 355, 445, 385 B, 40; 428/539, 480; 210/37

[56] References Cited
UNITED STATES PATENTS

| | | |
|---|---|---|
| 3,352,424 | 11/1967 | Guebert et al.................. 210/37 X |
| 3,821,014 | 6/1974 | Haskell et al.................. 428/539 X |
| 3,853,588 | 12/1974 | Haskell et al.................. 428/539 X |
| 3,853,591 | 12/1974 | Haskell et al.................. 428/539 X |

Primary Examiner—Ralph Husack

[57] ABSTRACT

The process of coating an organic polymeric shaped article with aluminum orthophosphate, using an anion compound as a source of aluminum, and topcoating with a polymer is further improved to enhance barrier properties under moist conditions. The aluminum orthophosphate coating is dried to effect no more than a partial cure and the anion concentration is reduced below about 1% of the weight of the solids content of the coating prior to completing the cure. The topcoating may be applied prior to completing the cure and then dried at a temperature to effect a substantially complete cure of the aluminum orthophosphate.

14 Claims, No Drawings

PROCESS FOR ANION REMOVAL FROM ORTHOPHOSPHATE COATINGS

BACKGROUND OF THE INVENTION

This invention relates to coating shaped articles and, more particularly, to applying orthophosphate coatings to films.

U.S. Pat. No. 3,821,014, to Haskell and Hecht, teaches the application of aluminum orthophosphate coatings to shaped objects such as films to achieve extraordinarily high moisture vapor and oxygen-barrier properties. It is disclosed to deposit the aluminum orthophosphate onto the film surface by the reaction of a phosphate compound such as phosphoric acid with an anion compound of aluminum such as aluminum chloride or aluminum chlorhydroxide, wherein the anion is the chloride ion. The patent stresses the need for removal of the HCl or chloride ion to insure good barrier properties but suggests it is not generally necessary when aluminum chlorhydroxide is used instead of $AlCl_3$. The patent indicates that excessive chloride ion removal from the dispersion causes premature gelation. The method disclosed for removal of chloride ion is dialysis or ion exchange resin treatment of the aqueous dispersion before application to the film. The orthophosphate coating is then dried at temperatures which effect a substantially complete cure thereof.

U.S. Pat. No. 3,853,588, to Haskell and Hecht, discloses the topcoating of orthophosphate-coated films with a vinylidene chloride copolymer containing about 2 to 30% of a polymeric epoxy resin to improve barrier properties under moist conditions.

U.S. Pat. No. 3,853,591, to Haskell, Hench and Yates, discloses the use of tin ions, among others, as a partial substitute for aluminum in the orthophosphate to further improve barrier properties.

SUMMARY OF THE INVENTION

It has been found that the known process for coating an organic polymeric shaped article with a cured aluminum orthophosphate coating having a topcoating thereover which comprises applying said orthophosphate from a dispersion containing an anion compound as the source of aluminum, drying the coating, topcoating it with an organic solvent solution of a polymer, preferably a vinylidene chloride copolymer, and drying said topcoating can be further improved by (1) drying the aluminum orthophosphate coating under temperature conditions to effect no more than a partial cure thereof, and (2) reducing the concentration of anion in said coating below about 1% of the weight of the solids content of said coating (dry basis) prior to completing the cure of said aluminum orthophosphate.

It has been found that polyethylene terephthalate (PET) films coated in accordance with the teachings of this invention could be produced which retain a high barrier to oxygen even after being immersed for an hour in boiling water making them very suitable for use as packaging films with good food preservation qualities.

DETAILED DESCRIPTION OF THE INVENTION

The basic teachings of preparing a dispersion of aluminum orthophosphate and coating it onto a substrate surface are set forth in U.S. Pat. No. 3,821,014, to Haskell and Hecht, the teachings of which are incorporated herein by reference. As indicated, the preferred technique includes the use of phosphoric acid and aluminum chlorhydroxide (preferably "Chlorhydrol," a 50% aqueous solution of aluminum chlorhydroxide, commercially available from Armour and Co.). It is preferred that the atom ratio of aluminum to phosphorus is between about 2.3 to 0.5, preferably between 1.3 to 0.8. Aqueous dispersions are generally preferred; however, organic solvents such as methanol or ethanol can be used to replace all or part of the water. Aluminum nitrate can also be used as a source of aluminum ion.

As indicated in U.S. Pat. No. 3,821,014, the dispersion may contain additives such as resins to improve wettability and adhesion of the coatings to the substrate to which they are applied. Such resins include melamine-formaldehyde resins, urea-formaldehyde resins, etc. Especially preferred is "Accobond 3524" trimethylol melamine modified with iminobispropylamine, commercially available from American Cyanamid Co. Up to about 50%, by weight of the phosphate of such additives, can be incorporated into the dispersion.

As disclosed in Haskell et al., U.S. Pat. No. 3,853,591, up to about 50% of the aluminum ion can be replaced with other metal ions such as tin ions, the teachings of which patent are incorporated herein by reference. This can be accomplished by replacing part of the aluminum chlorhydroxide with $SnCl_4 \cdot 5H_2O$. The aluminum chlorhydroxide should be added to the aqueous phosphoric acid first to avoid precipitation. An ion exchange resin such as "Rexyn 201" should be added to remove chloride ion.

As indicated in U.S. Pat. Nos. 3,821,014 and 3,853,591, the dispersion can be coated on one or both sides using the conventional coating techniques disclosed therein. The coating thickness should be sufficient to yield a coating weight of at least 0.02 gram/square meter ($g./m.^2$) of the phosphate on the coated surface, preferably from about 0.05 to about 0.25 $g./m.^2$ per side. The substrate surface should be pretreated by electrical discharge treatment or flame treatment well known to those skilled in the art.

After application of the phosphate coating dispersion, the coated substrate should be dried to remove excess water but not sufficiently to effect a complete cure. It is preferred that the drying temperature does not exceed about 100°C. during this stage, preferably less than about 80°C. The dryness of the coating at this stage should be such that there is no observable wetness, but that the coating should still be sufficiently uncured that touching it with a finger will leave a mark.

After drying to a partial cure, the concentration of anion (e.g., chloride or nitrate ion) in the coating is reduced to less than about 1% of the weight of the solids content of said coating (dry basis). This can be accomplished by diffusion of the anion into an adjacently placed anion acceptor layer. For example, a film coated with a partially cured phosphate dispersion coating can be interleaved with an absorbent paper, e.g., a 10-pound white tissue paper, uncoated cellophane, or a synthetic paper such as one made from highdensity polyethylene containing about 30% by weight of calcium carbonate filler and stretched to form voids around the filler as disclosed in Ikeda et al., U.S. Pat. No. 3,738,904. After interleaving, the paper and film are left usually at room temperature in good surface contact for a few days (three days to one week are typical). Ordinarily, the anion content is initially lowered during preparation of the orthophosphate coating bath by ion exchange resins or the like as described in Haskell et al., U.S. Pat. No. 3,821,014. However, even if such a step is not carried out, the technique described herein is very useful to reduce the anion concentration to a suitable level.

The amount of residual chlorine in the phosphate layer can be determined by X-ray emission using a GE Model XRD-5 machine with an SPG spectrometer (made by General Electric Co.). The measurement is made on a sample of coated film by detecting the "counts" in a 100-second interval. The sample is then placed in 10% nitric acid to remove the coating. After washing in distilled water and drying, the "counts" are measured again, those attributed to chloride ion in the coating being measured by difference. The machine is calibrated to determine what the value of the "counts" corresponds to in chloride ion concentration. In general, 1000 counts have been found to be equivalent to about 0.0035 g./m.$^2$ of chloride ion.

After the anion content in the phosphate coating has been reduced as described hereinabove, the cure of the aluminum orthophosphate is substantially completed. This can be done in one of two ways. The coated substrate can be dried and cured, prior to topcoating, at elevated temperatures and the topcoating can be applied and dried thereafter as described in Haskell et al., U.S. Pat. Nos. 3,821,014 and 3,853,588. Preferably, the coated substrate is topcoated before cure and the topcoating is dried at temperatures to effect a substantially complete cure of the aluminum orthophosphate as described in detail hereinafter.

After the anion content in the phosphate coating has been reduced to a desired level, the coated substrate is then topcoated with a polymer, preferably a vinylidene chloride polymer containing from about 2 to 30% of a polymeric epoxy resin as disclosed in U.S. Pat. No. 3,853,588, to Haskell and Hecht, the teachings of which are incorporated herein by reference. The vinylidene chloride monomer unit content of the polymer will be at least about 88% and preferably less than about 5% of the remaining units will be units of copolymerized aliphatic carboxylic acid such as itaconic acid or the like.

The epoxy compound content is preferably at least 3%, with 7% to 15% being particularly preferred. The epoxy compound should have a molecular weight of about 300 to 4,000 and an epoxide equivalent to carboxyl in the copolymer greater than 1 and preferably about 6 to 1. Especially suitable epoxy resins are those known as diglycidyl ethers of bisphenol A such as "Epon" resins (available from Shell Chemical Co.), especially "Epon 1001" and "Epon 828." Various other compounds and ingredients can be mixed into the topcoating composition as set forth in U.S. Pat. No. 3,853,588. It is preferred that the topcoating be applied from an organic solvent following techniques well known to those skilled in the art. A preferred topcoating weight is in the range of about 2 to 7 g./m.$^2$(dry basis), preferably about 3 to 5.5 g./m.$^2$.

Once the topcoating has been applied, the topcoated article should be dried at a temperature sufficient and for a long enough period of time to dry the topcoating and to complete the cure of the orthophosphate. A drying temperature between about 120° to 170°C. is recommended, with 130° to 155°C. being preferred. During final drying, more of the remaining anion will be driven off.

The substrate can be a wide variety of materials, usually in film form, such as cellophane, PET, polypropylene, polyimide, and polyvinyl fluoride. Oriented, heat-set PET is particularly suitable.

The invention will now be described in connection with examples of specific embodiments thereof wherein parts and percentages are by weight unless otherwise indicated.

EXAMPLE 1

A biaxially oriented, heat-set PET film 0.00075 inch thick was treated for improved adhesion by electrical discharge treatment using a power level of 0.1 coloumb per square foot of film to treat each side of the film. This film was then coated with the following bath:

| | | |
|---|---|---|
| Water | 10,000 | grams |
| 86.6% H$_3$PO$_4$ | 272 | " |
| "Accobond 3524" | 56 | " |
| "Chlorhydrol" | 460 | " |

The coating was carried out in a tower 16 inches in width which contained a radiant drying section 70 inches in height. Air was circulated countercurrent to the film. The film was coated on both sides by doctor-roll coating, the doctor rolls being adjusted to give a coating weight of aluminum orthophosphate of 0.24 gram per square meter (total coating weight), as measured by X-ray fluorescence, as described in Haskell & Hecht, U.S. Pat. No. 3,821,014. The film was passed through the coating tower at a speed of 40 fpm.

It was of particular importance in making the good product to take care that the film was not overheated duringdrying and partial curing. The variacs for the radiant heaters were set so that the temperatures of the air in the dryer was controlled at about 75°C. When this was done, the film was just barely dried, as evidenced by the fact that there was no shrinkage of the film in the transverse direction during coating and, if the speed was increased to 50 fpm, the coating was not completely dried.

When the film was wound up after coating, it was interleaved with a 10-pound white tissue paper (from the Crystal Tissue Company). The interleaved film was then stored for five days, during which time chloride ion migrated from the inorganic coating to the paper. This migration is readily apparent by analyzing the coating and the paper for chlorine atoms using X-ray fluorescence using an XRD-5 machine with an SPG spectrometer (made by the General Electric Company). At the end of five days, the counts for chlorine in the inorganic layer during a period of 100 seconds was only 330. This was measured by first testing the coated film and then testing the same sample after all of the coating had been removed by nitric acid. The 330 count represents about 0.5 weight percent chlorine based on the dry weight of the coating and is roughly 10% of the chlorine present immediately after coating the film with the aqueous inorganic bath.

The film was then topcoated with a vinylidene chloride polymer (VCl$_2$) bath containing 15% of "Epon 1001" epoxy resin as an adhesion promoter. The VCl$_2$polymer contained about 93.5 VCl$_2$ units, 3% acrylonitrile units, 3% methyl methacrylate units, and 0.5 itaconic acid units. The bath formulation used was:

| | | |
|---|---|---|
| VCl$_2$ polymer | 255 | grams |

-continued

| "Epon 1001" | 45 | " |
| --- | --- | --- |
| $H_3PO_4$ | 2 | " |
| Flat Hydrate D talc | 2 | " |
| "Aristowax" microcrystalline wax | 2.8 | " |
| Toluene | 500 | cc. |
| Tetrahydrofuran (THF) | 1190 | cc. |

The topcoating was carried out in an 11-inch solvent tower which was 88 inches in height. The film speed was 30 fpm and the air temperature in the tower was about 140°C. The coating weight was about 4 grams per square meter.

The resulting film had an I.P.V. (i.e., moisture permeability) of 2 g./100 m.²/hr. as measured on a Honeywell Model W825 water vapor transmission tester and an O.P.V. (i.e., oxygen permeability) of less than 0.02 cc./100 in.2/24 hrs./atm. as measured by an "Ox-Tran 100" (Modern Controls Inc.) instrument. Film which had been exposed to a humidity of 100% RH for a week still had this same low O.P.V. Heatseal strengths of this films, when made at 130°C. at a pressure of 5 psi. with a 0.5 -second dwell time averaged 180 grams per inch when peeled in an environmental room at 100°F. and 80% RH after 48 hours exposure in the room. It is usual, however, for films made from the same coating bath but not subjected to the anion removal or associated steps to have heat-seal strengths of from about 20 to 40 grams per inch when peeled in the environmental room.

EXAMPLE 2

The teachings of Example 1 were generally repeated except as follows:

The coating bath used was:

| Water | 6000 | grams |
| --- | --- | --- |
| $H_3PO_4$ | 298 | " |
| "Accobond" | 64 | " |
| "Chlorhydrol" | 351 | " |
| $SnCl_4 \cdot 5H_2O$ | 120.8 | " |
| Ion exchange resin ("Amberlite IRA 400") (m.eq. = 1.56) | 950 | " |

After 5 minutes of mixing, the "Amberlite" was filtered and washed with 5000 grams of water and the filtrate was added to the bath. The coating was at standard conditions, the coating weight being about 0.2 g./m.². The topcoating was also at standard conditions. The topcoating can be post-heated at 140°C. for about 20 seconds or applied in a tower where the air temperature is high enough to heat the film to about 143°C.

Films prepared in this manner have been found to retain high barrier properties (i.e., an O.P.V. less than about 0.02) after as much as 60 minutes immersion in boiling water. It is usual, however, for films made from the same coating bath, but not subjected to the anion removal and associated steps, to lose the O.P.V. barrier properties after 5 to 10 minutes immersion in boiling water.

The teachings of this example with respect to coating bath and coating conditions have been substantially repeated and the PET film was coated to a weight of about 0.24 g./m.². The coated film was dried but not cured and then interleaved with paper as described above and stored for about 105 days. Thereafter, the coated film was heated to complete the cure of the coating before applying the vinylidene chloride copolymer by running the film through the 11-inch tower described hereinabove at about the same conditions.

After the phosphate-coated film was cured as described, the vinylidene chloride copolymer was applied and dried as described hereinabove. A comparison of heat-seal strengths at 100°F. at 80% R.H. indicates little difference between such films and similar films wherein the only difference is that the curing of the phosphate coating is accomplished during drying of the vinylidene chloride copolymer.

EXAMPLE 3

Example 1 was essentially repeated except as follows:
The paper used for interleaving was a synthetic paper of 30% $CaCO_3$ and 70% high-density polyethylene 2 mils in thickness with a density of 0.45 stretched as described in the Ikeda et al. patent. The synthetic paper was effective to remove the chloride ion content to a desired level from coatings having a coating weight of about 0.24 g./m.², and topcoated films were produced exhibiting heat-seal strengths at about 100°F. and 80% RH of about 160 g./inch.

EXAMPLE 4

Example 1 was essentially repeated but $Al(NO_3)_3 \cdot 9H_2O$ was substituted for "Chlorhydrol" in the following bath:

| Water | 2500 | grams |
| --- | --- | --- |
| $H_3PO_4$ | 97 | " |
| $Al(NO_3)_3 \cdot 9H_2O$ | 280 | " |
| "Amberlite IRA 400" (m.eq. = 1.62) | 1200 | " |

After stirring the "Amberlite" for 5 minutes, it was filtered and washed with 1200 grams of water. The filtrate was added to the bath along with 18 grams of "Accobond".

The coating was applied to 75-gage, electric discharge treated, biaxially oriented, heat-set PET film on the 16-inch tower. The film was prepared as described in Example 1 at a coating weight of about 0.27 g./m.² and found to exhibit heat-seal strengths at 100°F. and 80% RH of about 230 g./inch. However, in similar films made up without the anion removal of interleaving (coating weight of about 0.25 g./m.²), heat-seal strengths were found to be only about 40 g./inch.

While the instant invention has been found to improve the orthophosphate barrier coatings of aluminum alone or with a minor amount of another metal such as tin present, it is believed that it could also improve the barrier coatings of ferric orthophosphate either alone or with a minor amount of another metal such as those suggested in U.S. Pat. No. 3,821,014.

Although the final drying step of the instant invention is accomplished after the topcoating is applied, it is believed that the final drying and curing step may take place before addition of the topcoating (which, of course, will have to be dried in a subsequent step) and still yield an improvement in barrier properties under moist conditions.

The inorganic barrier-coated films can be combined in various ways with other flexible materials. In general, it is preferred to have a barrier with vinylidene chloride coating at least over the inorganic layer whether on one or two sides of the base. Transparent laminates with polyolefins can be prepared by melt extrusion on the base or by adhesive lamination. When adhesives are used, isocyanate-cured adhesives, polyurethanes, and epoxy-cured compositions have been found useful. The low-melting polyolefins such as low-density polyethylene, ionomers, and ethylene/vinyl acetate copolymers provide rugged sealable layers. Oriented polypropylene and cellophane laminates make attractive packaging materials. Depending on what is to be packaged, fluorine-containing polymers or acrylonitrile or methacrylonitrile polymers may be laminated. In the latter cases, the lamination may be carried out before or after the vinylidene chloride copolymer layer has been applied. The copolymer layer may be used for heat sealing the laminate to itself or other surfaces or additional sealable layers may be applied. The barrier film may be combined with pressure-sensitive coatings as well.

There are some applications where clarity is not required and the base layer for the barrier coating may be pigmented or opaque such as in protecting light-sensitive materials. The clear barrier may be combined with other opaque layers. Aluminum foil forms pinholes on flexing. The durability of a package with aluminum foil is improved by lamination with a barrier film. Laminates may be made with paper either of natural fibers or synthetic. Papers take printing and improve tear resistance.

A series of laminates typical of those described above are:

B — base film typically oriented heat-set polyethylene terephthalate but may be the other described base polymers. Typical thicknesses are ¼ to 2 mils.
I — inorganic coating based on aluminum or iron orthophosphate.
S — sealable coating layer of saran.
A — adhesive normally about 0.3 mil.
  S/B/I/S/A/1-mil polypropylene
  S/A/I/S/3-mil extruded ionomer
  S/I/B/I/S/2-mil low-density polyethylene (LDPE)
  B/I/A/2-mil LDPE
  S/I/B/S/A/0.25-mil aluminum foil/2-mil LDPE
  S/I/B/I/S/A/2-mil LDPE
  S/B/I/saran-coated cellophane
  S/I/B/I/S/A/30-pound MG paper
  S/I/B/I/S/I/B/I/S
  S/B/I/A/cellophane/S
  Opaque polyester/A/S/I/B/I/S

I claim:

1. In a process for coating an organic polymeric shaped article on at least one surface with a cured aluminum orthophosphate coating having a topcoating thereover which comprises applying said orthophosphate from a dispersion containing an anion compound as the source of aluminum, drying said coating, depositing thereover a topcoating of an organic solvent solution of a polymer, and drying said topcoating, the improvement which consists in (1) drying said aluminum orthophosphate coating under temperature conditions to effect no more than a partial cure thereof, and (2) thereafter reducing the concentration of anion in said coating below about 1% of the weight of the solids content of said coating, dry basis, prior to completing the cure of said aluminum orthophosphate.

2. The process as defined in claim 1 wherein said topcoating is applied prior to completing the cure of said aluminum orthophosphate coating and said topcoating is dried under temperature conditions to effect a substantially complete cure of said coating.

3. The process defined in claim 2 wherein said shaped article is polyethylene terephthalate film and said topcoated polymer is a sealable vinylidene chloride polymer.

4. The process as defined in claim 3 wherein said temperature conditions to effect no more than partial cure are not greater than about 80°C.

5. The process as defined in claim 3 wherein said temperature conditions to effect a substantially complete cure are within the range of about 130°C. to 155°C.

6. The process as defined in claim 3 wherein up to about 50% of the aluminum ions in said aluminum phosphate are replaced with tin ions.

7. The process as defined in claim 3 wherein said topcoating contains a minor amount of a polymeric epoxy resin.

8. The process as defined in claim 3 wherein said anion is chloride ion.

9. The process as defined in claim 3 wherein the coating contains up to about 30%, by weight of the aluminum orthophosphate, of an adhesion-promoting additive selected from the group of melamine-formaldehyde resins or urea-formaldehyde resins.

10. The process as defined in claim 3 wherein said polyethylene terephthalate film is treated with electrical discharge to promote adhesion prior to coating.

11. The process as defined in claim 3 wherein the dried coating weight of said coating is between about 0.05 and 0.25 grams/square meter per side and the dried coating weight of said topcoating is between about 2 and 7 grams per square meter per side.

12. The process as defined in claim 3 wherein said vinylidene chloride polymer is a copolymer of at least 88% vinylidene chloride units and less than 5% copolymerized aliphatic carboxylic acid units, and wherein said polymeric epoxy resin is a diglycidyl ester of bisphenol A.

13. The process as defined in claim 3 wherein said step of reducing the concentration of anion is carried out by diffusion into an adjacently placed anion acceptor layer.

14. The process as defined in claim 13 wherein said acceptor layer is an absorbent paper.

* * * * *